No. 778,348. PATENTED DEC. 27, 1904.
I. ANDERSON.
METHOD OF RECOVERING PRECIOUS METALS FROM SOLUTIONS.
APPLICATION FILED NOV. 6, 1903.
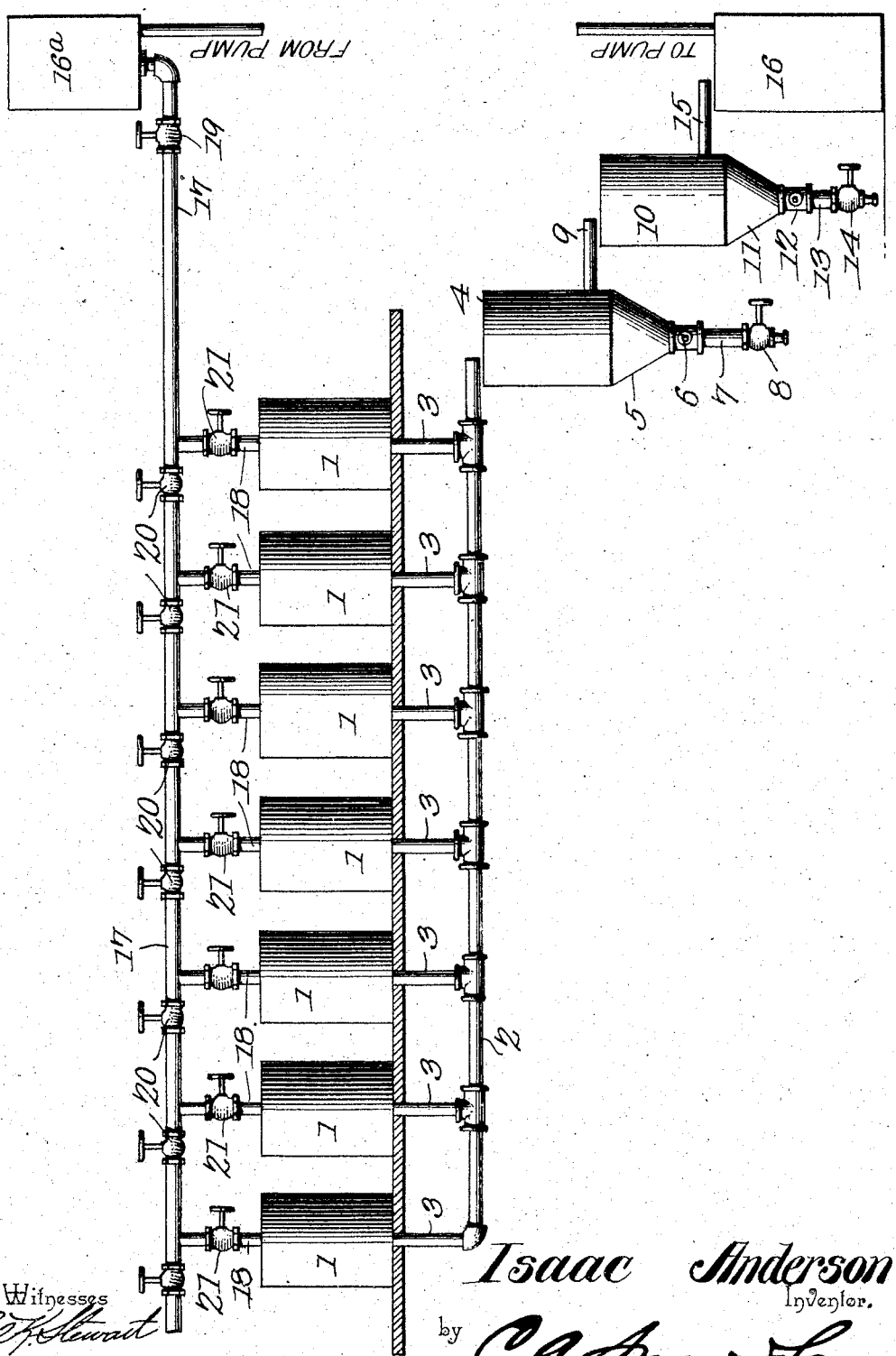
Witnesses
Isaac Anderson
Inventor.
by C. A. Snow & Co.
Attorneys No. 778,348.

Patented December 27, 1904.

UNITED STATES PATENT OFFICE.

ISAAC ANDERSON, OF PRESCOTT, ARIZONA TERRITORY, ASSIGNOR OF ONE-HALF TO MICHAEL SCANLON, OF WHITEHILLS, ARIZONA TERRITORY.

METHOD OF RECOVERING PRECIOUS METALS FROM SOLUTIONS.

SPECIFICATION forming part of Letters Patent No. 778,348, dated December 27, 1904.

Application filed November 6, 1903. Serial No. 180,074.

*To all whom it may concern:*

Be it known that I, ISAAC ANDERSON, a citizen of the United States, residing at Prescott, in the county of Yavapai and Territory of Arizona, have invented a new and useful Method of Recovering Precious Metals from Solutions, of which the following is a specification.

This invention relates to methods of recovering precious metals from solutions, and has special reference to improved means for recovering gold and silver from solutions in which they are held by means of cyanid of potassium.

The principal object of the invention is to provide improved means for recovering gold and silver from cyanid solutions without causing the deposition with the gold and silver of zinc or other base metal and without rendering the cyanid solution unfit for further use.

A further object of the invention is to provide a method of precipitating gold and silver values from cyanid solutions in a rapid, ready, and certain manner at less cost than such precipitation has heretofore been effected.

A further object of the invention is to provide an improved method of precipitating gold and silver values from cyanid solutions in such manner that the solution remaining after the values are precipitated may be readily restored to its original activity with but small loss of the original solution and at small cost for regeneration.

The method is based upon the fact that when sulfuric acid is added to cyanid solutions of the precious metals in which sulfids and chlorids are present the sulfuric acid so added will combine with the potassium of the potassium cyanid to decompose the double cyanids formed by the action of the potassium cyanid on the precious metals, and the precious metals freed from combination with the potassium cyanid will then combine with the sulfur and chlorin present to form insoluble sulfids and chlorids, which will be precipitated, leaving the cyanogen in the liquid in the form of hydrocyanic acid or in combination with the radicals with which the sulfur and chlorid has been combined. The precious metals having been precipitated as chlorids or sulfids, the supernatant solution may be decanted off and the potassium cyanid regenerated by decomposing the potassium sulfate formed by the action of the sulfuric acid and removing the sulfuric acid from the solution. This decomposition of the potassium sulfate and the removal of the sulfuric acid may be readily accomplished by introducing lime into the solution decanted off the precipitated gold and silver values, the lime so added causing the decomposition of the potassium sulfate, with the formation of insoluble calcium sulfate and the simultaneous regeneration of potassium cyanid.

In carrying out the invention I prefer to use the apparatus illustrated somewhat diagrammatically in the accompanying drawing; but any other suitable apparatus may be employed instead, if desired.

In the drawing, 1 1 1 1 1 1 designate pulp-vats of any suitable character, in which the leaching of the pulverized ores with potassium-cyanid solution may be carried on in any ordinary or preferred manner. Beneath the pulp-vats 1 extends a conduit 2, into which all of the pulp-vats discharge through outlet-pipes 3, and the conduit 2 conveys the solution obtained by leaching the ore in the pulp-vats. All of the solution passes along the conduit to precipitation-vat 4, which is preferably of ordinary form in the upper part and provided with a tapering bottom 5, in the middle of which is fixed a valve 6 over a chamber 7, at the bottom of which is a second valve 8. A pipe 9 leads from the bottom portion of the precipitation-vat 4 to a cyanid-recovery vat 10, which is supported at a lower level than the precipitation-vat. The cyanid-recovery vat is of substantially the same construction as the precipitation-vat, being provided with a tapering bottom 11 and valve 12 in the tapering bottom, a receiving-chamber 13 beneath the valve 12, and a discharge-valve 14 at the bottom of the chamber. A pipe 15 leads from the lower portion of the vat 10 into a sump-tank 16, into which the regenerated cyanid solution is allowed to flow and from which it will be pumped to a tank $16^a$ for storage. The tank $16^a$ is supported at a higher level than the pulp-vats, and it discharges through a conduit 17, which extends over the pulp-vat and has branches 18 leading thereinto. A valve 19 is provided in the conduit 17 adjacent to the storage-tank $16^a$, and similar valves 20 are provided at intervals throughout the length of the conduit just beyond the points of divergence of the branch pipes 18. Valves 21 are provided in the branch pipes 18 also, and the set of valves 19, 20, and 21 form means whereby the flow of the cyanid solution from the tank $16^a$ into any or all of the pulp-vats may be regulated as desired.

In carrying out my improved method of recovering values from solutions by means of the apparatus described the solution obtained by leaching the ore in the pulp-vats will be allowed to flow into the precipitation-tank, the valve itself being closed. Then sulfuric acid will be added at once to the solution if sulfur and chlorin in the form of sulfids and chlorids are already present in the solution. If the solution contains no sulfids and chlorids, some soluble sulfid or chlorid, or both, will be added to the solution, according to the character of the precious metals contained therein, the chlorid and sulfid of sodium being the compounds preferred for this purpose. The sulfuric acid will then be added and thoroughly agitated to cause the decomposition of the soluble double cyanids containing the precious metals, and the solution will then become turbid, owing to the separation of the precious metals as insoluble chlorids or sulfids, or both. After the turbidity of the solution has disappeared and the precipitate has settled in the bottom of the tank the valve 6 will be opened to allow the precipitate to pass into the chamber 7, the valve 8 being closed. The precipitate having itself passed into the chamber 7, the valve 6 will be closed and the valve 8 opened to discharge the precipitate into suitable receptacles, in which it will be conveyed away for treatment in any preferred manner to recover the precious metal in metallic form therefrom. The liquid remaining in the vat 4 after the removal of the precipitate will then be allowed to pass through the pipe 9 into the cyanid-regeneration tank 10, the valve 12 of which will be closed. The solution having been transferred into the vat 10, lime in sufficient quantity to combine with all the sulfuric acid present will be introduced into the solution, forming a precipitate of calcium sulfate, while the potassium previously in combination therewith will recombine with the hydrocyanic acid present to form potassium cyanid. The calcium sulfate formed by the addition of lime to the solution will settle to the bottom of the tank and may be allowed to pass into the chamber 13 by opening the valve 12. When the calcium sulfate has passed into the chamber 13, the valve 12 will be closed and the valve 14 opened to discharge the precipitated calcium sulfate, while the regenerated cyanid solution flows into the sump-tank 16, from which it will be pumped as required to the storage-tank $16^a$. The calcium sulfate precipitated by the addition of lime to the solution after the precipitation of the gold and silver values therefrom is not a waste product, but may be used for smelting and for other purposes.

If sodium compounds be used to supply the sulfur and chlorin necessary in practice of the process, the reactions involved in the separation of gold and silver will be as follows, the reactions in the separation of the two metals being given separately to avoid confusion:

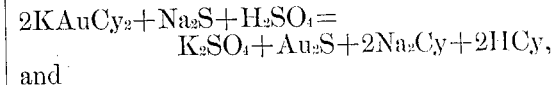

$$2KAuCy_2 + Na_2S + H_2SO_4 = K_2SO_4 + Au_2S + 2Na_2Cy + 2HCy,$$

and

$$2KAgCy + 2NaCl + H_2SO_4 = K_2SO_4 + 2AgCl + 2NaCy.$$

The reaction which takes place in regenerating the cyanid solution by the addition of sulfuric acid to the liquid decanted off the precipitate containing the precious metals is ordinarily as follows:

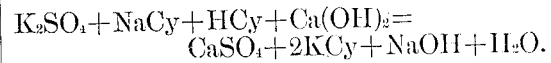

$$K_2SO_4 + NaCy + HCy + Ca(OH)_2 = CaSO_4 + 2KCy + NaOH + H_2O.$$

As compared with the ordinary method of precipitating values from cyanid solutions by the use of zinc shavings or electrolysis the method outlined above presents numerous advantages. The present method is considerably quicker, as well as cheaper, than either of the ordinary methods, the values precipitated are not intermixed with quantities of zinc from which they must be separated, as when zinc shavings are used as the precipitating agent, and the cyanid solution may be regenerated after the precipitation of the values therefrom with a comparatively small loss of its efficiency, ninety per cent. or more of the cyanid solution being susceptible of regeneration after each precipitation.

Another feature of advantage in this method lies in the fact that if the cyanid solutions are fouled by the presence of iron and copper salts no interference with the practice of the process results, as these metals are not precipitated by the agents employed to precipitate the gold and silver values; but, on the contrary, the salts of iron and copper appear when present to facilitate the precipitation of the precious metals by catalytic action.

Having thus described the nature and use of my invention, what I claim as new, and desire to secure by Letters Patent, is—

1. The process of recovering precious metals from a cyanid solution consisting in introducing soluble chlorids and sulfids into the solution and then adding a mineral acid which will cause the decomposition of the cyanid solution with the formation of compounds of the precious metals and the sulfur and chlorin present.

2. The process of recovering precious metals from a cyanid solution consisting in adding soluble sulfids and chlorids to the said solution and then adding sulfuric acid thereto.

3. The process of recovering precious metals from a cyanid solution and regenerating the cyanid solution consisting in introducing into the cyanid solution radicals with which the precious metals will form compounds insoluble in a solution of potassium cyanid, then adding sulfuric acid to the solution to precipitate insoluble compounds of the precious metals, separating the solution from the precipitate and regenerating the cyanid solution by precipitating the sulfuric acid present by means of the addition of lime.

4. The process of regenerating potassium-cyanid solutions from solutions containing potassium sulfate and hydrocyanic acid consisting in adding lime to the solution.

In testimony that I claim the foregoing as my own I have hereto affixed my signature in the presence of two witnesses.

ISAAC ANDERSON.

Witnesses:
 E. E. CUTLER,
 F. M. McDONALD.